United States Patent
Xu

(10) Patent No.: US 11,422,050 B2
(45) Date of Patent: Aug. 23, 2022

(54) TEMPERATURE-PRESSURE INTEGRATED SENSOR WITH IMPROVED ASSEMBLY AND PROCESSING

(71) Applicant: SHENZHEN ANPEILONG TECHNOLOGY CO., LTD., Guangdong (CN)

(72) Inventor: Wen Xu, Guangdong (CN)

(73) Assignee: SHENZHEN ANPEILONG TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/972,589

(22) PCT Filed: Aug. 16, 2018

(86) PCT No.: PCT/CN2018/100742
§ 371 (c)(1),
(2) Date: Dec. 5, 2020

(87) PCT Pub. No.: WO2019/232930
PCT Pub. Date: Dec. 12, 2019

(65) Prior Publication Data
US 2021/0239560 A1    Aug. 5, 2021

(30) Foreign Application Priority Data
Jun. 6, 2018 (CN) .......................... 201810575009.3

(51) Int. Cl.
*G01L 19/00* (2006.01)
(52) U.S. Cl.
CPC ...... *G01L 19/0092* (2013.01); *G01L 19/0007* (2013.01); *G01L 19/0061* (2013.01)
(58) Field of Classification Search
None
See application file for complete search history.

(56) References Cited

U.S. PATENT DOCUMENTS

| | | | |
|---|---|---|---|
| 8,935,961 B2* | 1/2015 | Papadeas | G01L 19/0092 |
| | | | 73/714 |
| 2014/0150540 A1 | 6/2014 | Lenferink et al. | |
| 2018/0073950 A1* | 3/2018 | Bae | G01L 19/0038 |

FOREIGN PATENT DOCUMENTS

| | | |
|---|---|---|
| CN | 102980714 A | 3/2013 |
| EP | 1790964 A1 | 5/2007 |
| EP | 2749855 A2 | 7/2014 |

OTHER PUBLICATIONS

International Search Report of PCT Patent Application No. PCT/CN2018/100742 dated Feb. 27, 2019.

(Continued)

*Primary Examiner* — Lisa M Caputo
*Assistant Examiner* — Nigel H Plumb

(57) ABSTRACT

A temperature-pressure integrated sensor, includes the following sequentially connected components: an electrical connecting member, a pressure sensor element, and a basal body assembly. A flexible modulation circuit board is provided between the pressure sensor element and the electrical connecting member. The pressure sensor element is directly connected to the flexible modulation circuit board. The flexible modulation circuit board is connected to a conductive extension portion. The conductive extension portion extends from a top end of the pressure sensor element to a bottom end surface of the basal body assembly. A bottom end of the conductive extension portion is provided with a temperature sensor element. The flexible modulation circuit board is coupled to the pressure sensor element and the temperature sensor element, such that the flexible modulation circuit processes and converts both a pressure signal and a temperature signal, and a temperature-pressure integrated sensor is acquired.

18 Claims, 5 Drawing Sheets

(56) References Cited

OTHER PUBLICATIONS

Search report of counterpart European Patent Application No. 18922005.6 dated Feb. 8, 2022.

* cited by examiner

TEMPERATURE-PRESSURE INTEGRATED SENSOR WITH IMPROVED ASSEMBLY AND PROCESSING

CROSS-REFERENCE TO RELATED APPLICATIONS

The present application claims the priority to Chinese Patent Application No. 201810575009.3 filed on Jun. 6, 2018. The entire contents of the applications are hereby incorporated by reference in their entirety.

TECHNICAL FIELD

The present application belongs to the field of sensor technology, and specifically relates to a temperature-pressure integrated sensor.

BACKGROUND TECHNOLOGY

A sensor is an important component in an industrial control system. It is used to sense the measured information and convert the measured information into electrical signals or other required forms of information output according to a certain rule. Each traditional sensor can only be used to measure one physical quantity. With the increasing development of automated monitoring technology, a sensor with a single measuring function can no longer meet the needs. In actual use, it is often necessary to measure multiple parameters at one location at the same time, especially temperature and pressure parameters which often need to be acquired at the same time. If separate temperature sensor and pressure sensor are used to measure the parameters separately, it is difficult to ensure the same position of the measured points, and it is costly to purchase the two sensors separately.

In order to solve the above problem, a temperature-pressure integrated sensor has become a research hotspot in the industry. Temperature sensors and pressure sensors are the two mostly used sensors in the sensor industry, and they often need to be used together. The emergence of temperature-pressure integrated sensors solves the problems of large occupying space and inaccurate test data of the traditional independent sensors.

For example, Chinese Patent No. 102980714 discloses combination pressure/temperature in a compact sensor assembly. The sensor assembly is provided with a mid-plate assembly. The mid-plate assembly includes at least one disk-shaped element and a hollow probe element. A temperature sensor element is mounted in the hollow probe element. The lead wire of the temperature sensor element needs to pass through the hollow probe element and then through the mid-plate assembly to reach the hollowed volume at the notch, and finally couples with the terminal of the electronic circuitry. In this type of sensor assembly, the efficiency of the wiring operation of the wire of the temperature sensor element is very low, and the coupling of the wire with the terminal requires a suitable process to achieve. This process may cause damage to the wire, thereby affecting the performance of the electrical connection of the sensor. In addition, the disc-shaped element and the hollow probe element that make up the mid-plate assembly need to be separately processed and formed before being assembled. This makes the sensor manufacturing process cumbersome, and it also increases the manufacturing cost of the sensor.

European Patent No. 2749855A2 discloses a sensor assembly. The sensor assembly has a protective cover formed by plastic injection moulding, which is used to install the sensor assembly and expose it to the medium to be measured by the sensor. The sensor assembly has a relatively large installation size and limited applications. Furthermore, in this type of sensor assembly, the length of the sensor probe changes in order to adapt to different temperature measurement requirements. It means that injection mouldings for different measurement situations are needed to produce sensor probes of different lengths according to requirements. This is complicated and costly.

SUMMARY

For this reason, the present application aims to solve the above-mentioned technical problem and proposes a temperature-pressure integrated sensor which is compact in structure, small in size, easy to assemble, and low in cost.

In order to solve the above technical problem, the technical solution of the present application is given below.

The present application provides a temperature-pressure integrated sensor, including an electrical connecting member, a pressure sensor element, and a basal body assembly that are sequentially connected, a flexible modulation circuit board provided between the pressure sensor element and the electrical connecting member, the pressure sensor element connected with the flexible modulation circuit board, a conductive extension portion connected with the flexible modulation circuit board, the conductive extension portion extended from a top end of the pressure sensor element to a bottom end of the basal body assembly, and a temperature sensor element disposed at a bottom end of the conductive extension portion.

As preferred, it further includes a housing component, the housing component including an accommodating cavity and a probe being in communication with the accommodating cavity, the accommodating cavity being used for accommodating the flexible modulation circuit board, the pressure sensor element, the basal body assembly, and a portion of the electrical connecting member, the conductive extension portion extended to an inner bottom portion of the probe through the pressure sensor element and the basal body assembly.

As preferred, the pressure sensor element includes a base and a pressure-sensitive membrane provided at a bottom face of the base, and the flexible modulation circuit board is disposed at a top face of the base.

As preferred, the basal body assembly includes a cylindrical basal body and two flow-guiding columns disposed at a bottom portion of the cylindrical basal body, each flow-guiding column being provided with a through-hole disposed along an axial direction of the flow-guiding column for guiding a test fluid towards the pressure sensor element, the pressure sensor element being disposed at a top portion of the cylindrical basal body.

As preferred, a vertical guiding groove and a horizontal guiding groove are provided on a sidewall and a bottom face of the cylindrical basal body for accommodating the conductive extension portion; the electrical connecting member being provided with a clamping portion that is fitted into the vertical guiding groove, the clamping portion being clamped at the vertical guiding groove.

As preferred, an outer wall of each flow-guiding column is provided with a mounting groove, a first sealing ring being disposed in the mounting groove; a second sealing ring being disposed between the cylindrical basal body and the pressure sensor element.

As preferred, a counterbore is provided in the housing component at a position corresponding to the flow-guiding columns for installing the flow-guiding columns, a bottom portion of the counterbore being provided with a flow channel that is in communication with the counterbore for guiding ingress of the test fluid.

As preferred, the probe is a hollow cylindrical probe with a sealed bottom end, an outer portion of the probe being provided with a reinforcing layer, the inner bottom portion of the probe being provided with a heat conductive material layer, the heat conductive material layer being wrapped around an outer portion of the temperature sensor element.

As preferred, the conductive extension portion and the flexible modulation circuit board are integrally formed and free to bend, the conductive extension portion being disposed in close contact the vertical guiding groove and the horizontal guiding groove, and bent and extended in a direction away from the pressure sensor element, and disposed perpendicular to the bottom face of the cylindrical basal body at a center thereof, the conductive extension portion being fixed in the horizontal guiding groove through a H-shaped fastener.

As preferred, the sidewall of the cylindrical basal body is further provided with two mounting slots, the electrical connecting member being provided with clamping pieces that are fitted in the mounting slots, the clamping pieces being in snap connection with the mounting slots.

Compared with the prior art, the above-mentioned technical solution of the present application has the following advantages:

The temperature-pressure integrated sensor described in the present application includes an electrical connecting member, a pressure sensor element, and a basal body assembly that are sequentially connected. A flexible modulation circuit board provided between the pressure sensor element and the electrical connecting member. The pressure sensor element is connected with the flexible modulation circuit board, and a conductive extension portion is connected with the flexible modulation circuit board. A temperature sensor element is disposed at a bottom end of the conductive extension portion, and the conductive extension portion is extended from a top end of the pressure sensor element to a bottom end of the basal body assembly. The coupling of the flexible modulation circuit board with the pressure sensor element and the temperature sensor element realizes simultaneous processing and conversion of pressure signals and temperature signals by the flexible modulation circuit, thereby obtaining a temperature and pressure integrated sensor, which has a simple and compact structure and is easy to install in a test environment, and its range of application is wider. The conductive extension portion is installed from the outside of the pressure sensor element and the basal body assembly and extended below the basal body assembly. This solves the problems of difficult operation, low efficiency, and easy damage to the wires in a wiring operation of the traditional sensor. It is easy to assemble and has high manufacturing efficiency. In addition, the hollow cylindrical probe effectively prevents the temperature sensor element from being exposed to the measuring medium, especially a corrosive measuring medium.

BRIEF DESCRIPTION OF THE DRAWINGS

In order to make the contents of the present application easier to be clearly understood, the following further describes the application in detail according to specific embodiments of the application in conjunction with the accompanying drawings.

The reference signs in the figures are represented as: 1—electrical connecting member; 101—clamping portion; 102—clamping piece; 2—pressure sensor element; 201—base; 202—pressure-sensitive membrane; 3—basal body assembly; 301—cylindrical basal body; 302—flow-guiding column; 303—vertical guiding groove; 304—horizontal guiding groove; 305—H-shaped fastener; 306—mounting groove; 307—first sealing ring; 308—second sealing ring; 309—mounting slot; 4—flexible modulation circuit board; 401—conductive extension portion; 5—temperature sensor element; 6—housing component; 601—accommodating cavity; 602—probe; 603—flow channel; 604—reinforcing layer; 605—heat conductive material layer; 606—threaded interface.

DETAILED DESCRIPTION

The present embodiment provides a temperature-pressure integrated sensor, which is a sensor that can measure pressure signals and temperature signals at the same time. The integrated sensor is shown in FIGS. 1-6. The sensor includes an electrical connecting member 1, a pressure sensor element 2 and a basal body assembly 3, that are sequentially connected from top to bottom. A flexible modulation circuit board 4 is provided between the pressure sensor element 2 and the electrical connecting member 1.

Figure 1:
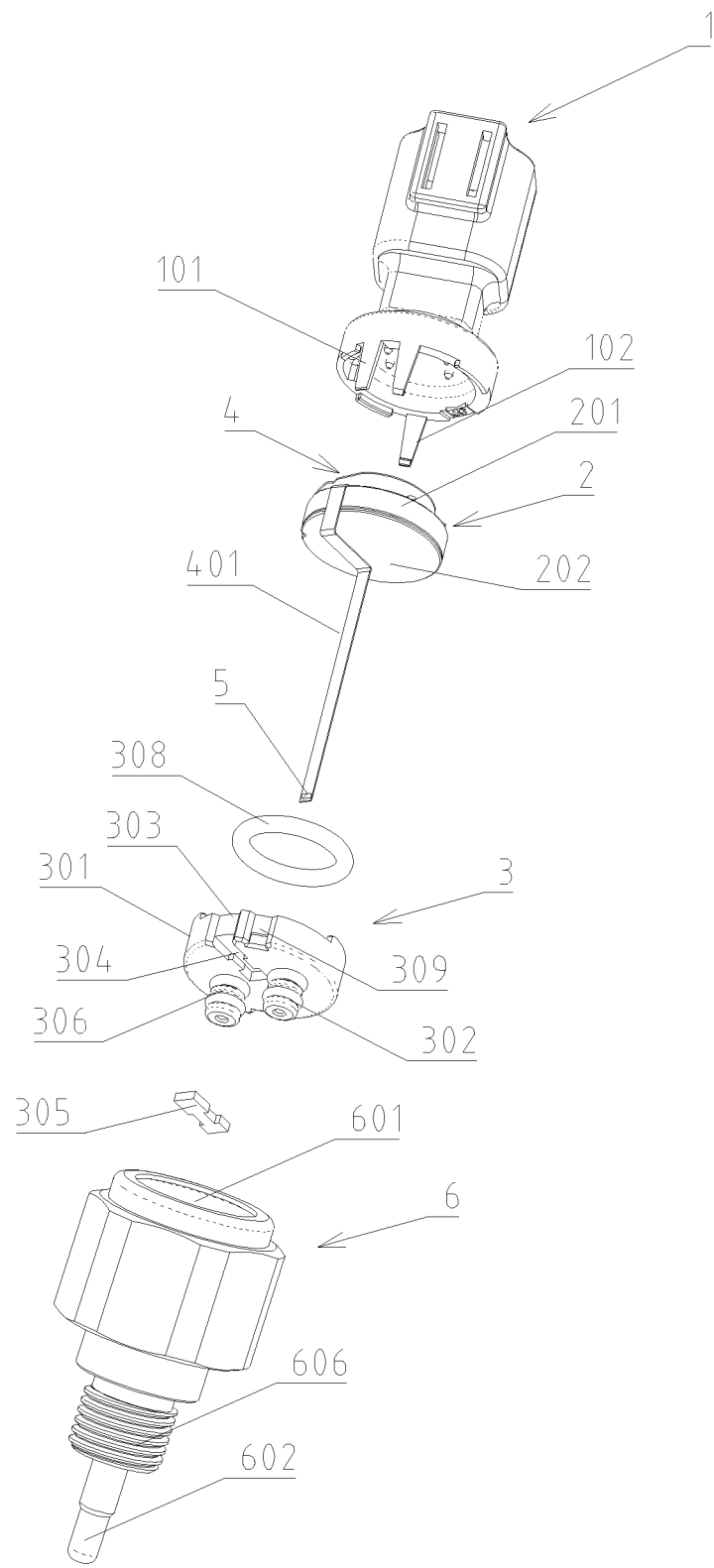
FIG. 1 is an exploded schematic diagram of the temperature-pressure integrated sensor according to an embodiment of the present application.

The electrical connecting member 1 is used to realize electrical connection with other mechanisms. The electrical connecting member can be customized according to requirements or can be a standard component. As shown in FIG. 1, the electrical connecting member 1 has an accommodating space at the bottom. The flexible modulation circuit board 4 is disposed on a top face of the pressure sensor element 2 and in the accommodating space. The flexible modulation circuit board 4 is made of a suitable material such as polyimide material, which has high reliability. It has a soft texture and a certain degree of toughness and strength, and can be bent and deformed freely without being damaged. The flexible modulation circuit board 4 is integrally formed and connected to a conductive extension portion 401. The material of the conductive extension portion 401 and the body of the flexible modulation circuit board 4 are the same, i.e., they are both made of a suitable material such as polyimide material. Due to its certain toughness and strength, it can be freely bent into a certain shape according to design requirements. The bottom end of the conductive extension portion 401 is provided with a temperature sensor element 5. The temperature sensor element 5 may be a platinum film temperature sensor, which is connected to the bottom end of the conductive extension portion 401 through a patch or other reliable connection method. The sensor described in this embodiment realizes simultaneous processing and conversion of pressure signals and temperature signals through the flexible modulation circuit board 4 by coupling the flexible modulation circuit board 4 with the pressure sensor element 2 and the temperature sensor element 5. It is a sensor that detect pressure and temperature signals at the same time.

Figure 2:
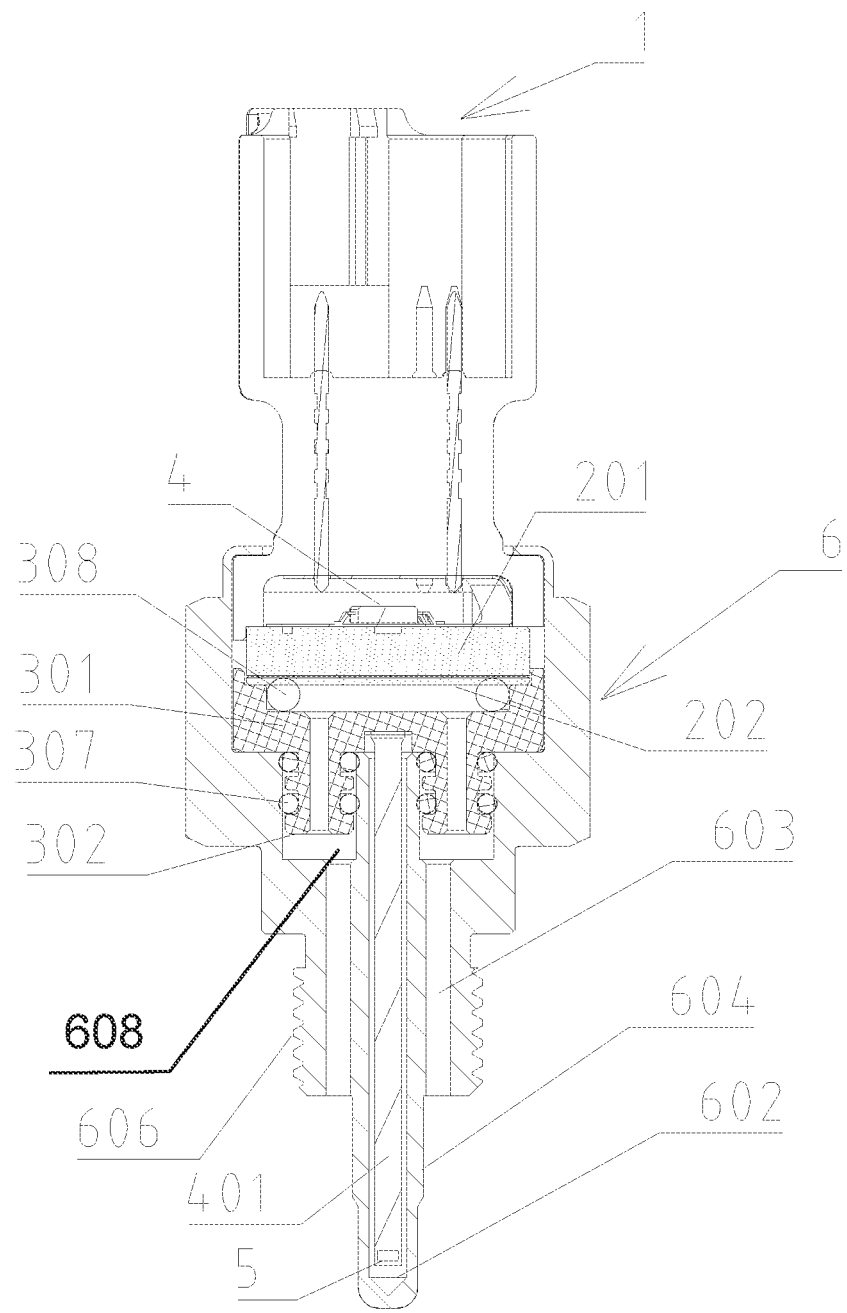
FIG. 2 is a cross-sectional view of the temperature-pressure integrated sensor according to an embodiment of the present application.
Figure 3:
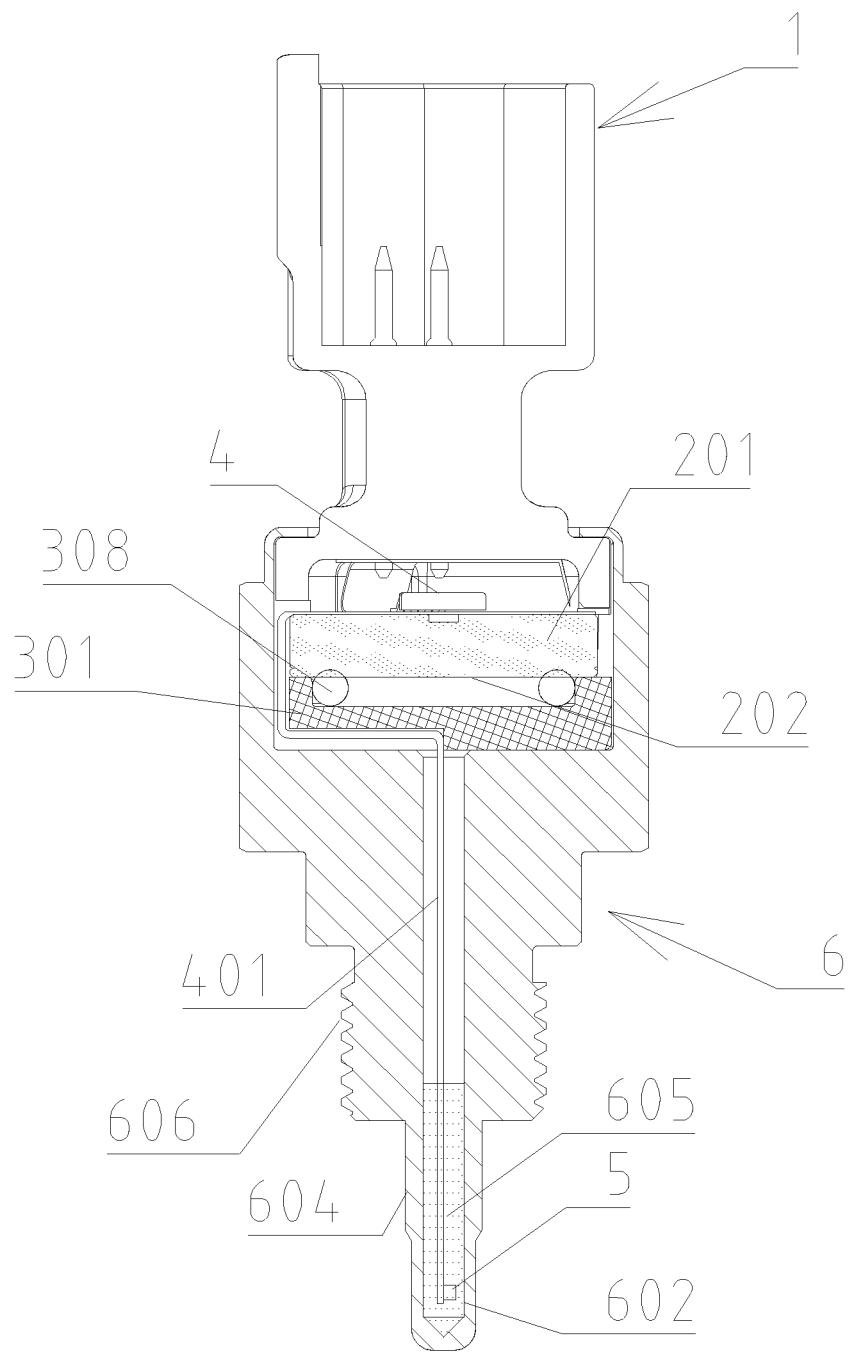
FIG. 3 is another cross-sectional view of the temperature-pressure integrated sensor according to the embodiment of the present application.
Figure 4:
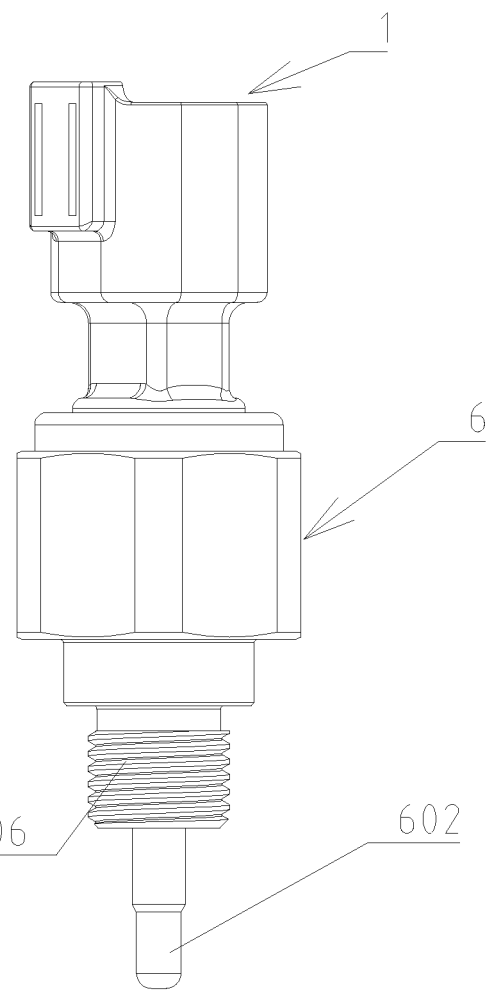
FIG. 4 is a schematic diagram of an assembled temperature-pressure integrated sensor according to an embodiment of the present application.
Figure 5:
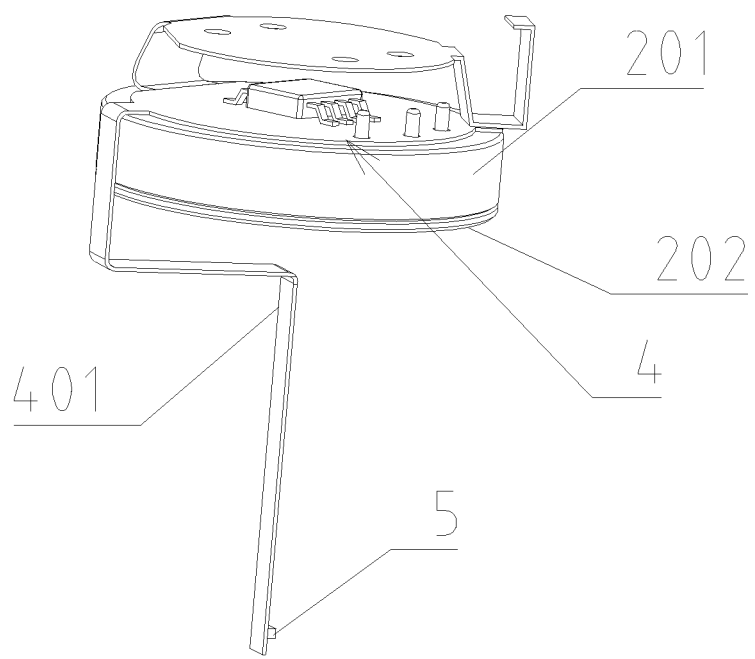
FIG. 5 is a schematic diagram of the pressure sensor element and the flexible modulation circuit board of the temperature-pressure integrated sensor according to an embodiment of the present application.
Figure 6:
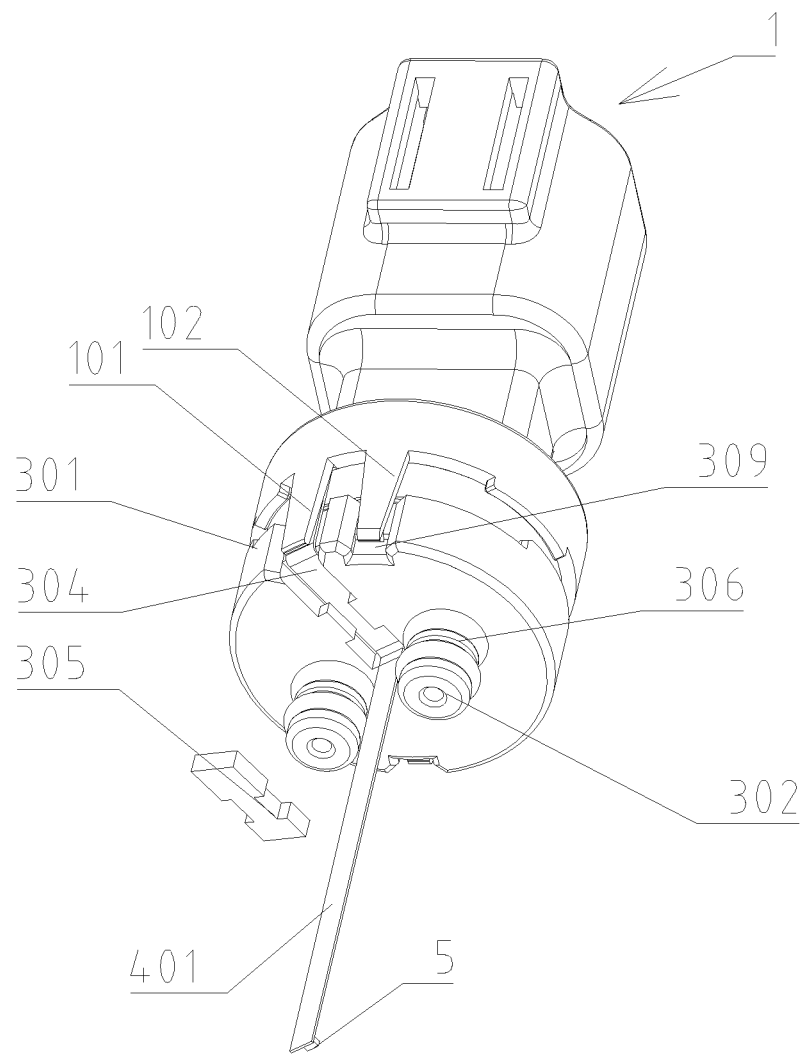
FIG. 6 is a schematic diagram of the temperature-pressure integrated sensor according to an embodiment of the present application when the housing component is not assembled.

As shown in FIGS. 1-2, the pressure sensor element 2 includes a base 201. A bottom face of the base 201 (the surface away from the electrical connecting member) is provided with a pressure-sensitive membrane 202. The base 201 is in the shape of a cylindrical body, and the corresponding pressure-sensitive membrane 202 is circular in shape. The flexible modulation circuit board 4 is disposed on a top face of the base 201, as shown in FIG. 1. The conductive extension portion 401 abuts against the top face and a side face of the base 201, and then bends and extends downwards. The pressure sensor element 2 may be a ceramic capacitive sensor element, or a ceramic piezoresistive sensor element, or other suitable sensor elements.

As shown in FIGS. 1-4, the basal body assembly 3 includes a cylindrical basal body 301, and two cylindrical flow-guiding columns 302 provided at a bottom portion of the cylindrical basal body 301. The cylindrical basal body 301 and the flow-guiding columns 302 can be manufactured by plastic injection moulding, which has a low manufacturing cost. The pressure sensor element 2 is disposed at a top portion of the cylindrical basal body 301. The cylindrical basal body 301 is provided with a through-hole at a position corresponding to the flow-guiding columns 302. The flow-guiding columns 302 are also hollow cylinders each having a through-hole disposed in the axial direction of the flow-guiding columns 302, enabling the flow-guiding columns 302 to communicate with the cylindrical basal body 301 and provide a necessary path for guiding the ingress of measuring medium to the circular pressure-sensitive membrane 202.

The sidewall and bottom face of the cylindrical basal body 301 are provided with a vertical guiding groove 303 and a horizontal guiding groove 304 for accommodating the conductive extension portion 401. The conductive extension portion 401 extends from the top face of the base 201 and bends to the sidewall of the base 201. Then, it abuts against the vertical guiding groove 303 and extends downwards to the bottom face of the cylindrical basal body 301. It then bends and abuts against the horizontal guiding groove 304 and extends to the centre of the cylindrical basal body 301. It then bends again and extends vertically downwards, and is finally disposed perpendicular to the bottom face of the cylindrical basal body 301. The width dimensions of the vertical guiding groove 303 and the horizontal guiding groove 304 match with the conductive extension portion 401, so that the conductive extension portion is accommodated in the vertical guiding groove 303 and the horizontal guiding groove 304. In order to fully fix the conductive extension portion 401, it further includes an H-shaped fastener 305 that is fitted to the horizontal guiding groove 304. The H-shaped fastener 305 is snugly fitted in the horizontal guiding groove 304, so that the conductive extension portion can be more tightly mounted in the guiding groove, and bent into a fixed shape so that it will not shake or fall apart easily. After fitting, the bottom face of the H-shaped fastener 305 is flush with the outer bottom face of the horizontal guiding groove 304. Furthermore, the H-shaped fastener 305 and the cylindrical basal body 301 can be formed by injection moulding at the same time. It does not require a separate mould or other processing method, and it reduces the manufacturing cost.

In order to assemble the electrical connecting member 1 with the basal body assembly 3, the electrical connecting member 1 is provided with a clamping portion 101 that matches the size of the vertical guiding groove 303. The clamping portion 101 is clearance fitted to the vertical guiding groove 303. The gap between the clamping portion 101 and the vertical guiding groove 303 in the depth direction of the vertical guiding groove can at least accommodate the thickness of the conductive extension portion 401. The clamping portion 101 fixes the conductive extension portion 401 in the vertical guiding groove 303. This further improves the stability of the mounting of the conductive extension portion 401.

The sidewall of the cylindrical basal body 301 is also provided with two mounting slots 309. The electrical connecting member 1 is provided with clamping pieces 102 that are fitted in the mounting slots 309. The clamping pieces 102 are in snap connection with the mounting slots 309, so that the electrical connecting member 1 and the cylindrical basal body 301 are firmly connected.

Since the sensor is usually used to detect the pressure and temperature of a fluid, it is necessary to ensure the sealing property of the sensor. To achieve this purpose, the outer wall of each flow-guiding column 302 is provided with a mounting groove 306. A first sealing ring 307 is installed in the mounting groove 306. The top portion of the cylindrical basal body 301 is provided with an accommodating portion. A second sealing ring 308 is installed in the accommodating portion. The pressure sensor element 2 is disposed on a top portion of the second sealing ring 308 (i.e., the second sealing ring is disposed between the pressure sensor element 2 and the cylindrical basal body 3). This has a sealing effect for the measuring medium. It prevents the measuring medium from entering the pressure sensor element 2, and from causing damage to the flexible modulation circuit board 4.

Furthermore, it further includes a housing component 6. The housing component 6 includes a cup-shaped accommodating cavity 601, and a cylindrical hollow probe 602 communicating with the accommodating cavity 601. The accommodating cavity 601 is used to accommodate the entire flexible modulation circuit board 4, the pressure sensor element 2, the basal body assembly 3, and a portion of the electrical connecting member 1. The conductive extension portion 401 extends from the accommodating cavity 601 to an inner bottom portion of the hollow probe 602 via the pressure sensor element 2 and the basal body assembly 3. A counterbore 608 for installing the flow-guiding columns 302 is provided at a bottom portion of the cup-shaped accommodating cavity 601 in the housing component 6 at a position that corresponds to the flow-guiding columns 302. The counterbore 608 provides a mounting space for the flow-guiding columns 302, and plays a guiding role. The bottom portion of the counterbore 608 is provided with a flow channel 603 in communication with the counterbore 608 for guiding the ingress of the measuring medium. One end of the flow channel 603 communicates with the outside, and the other end communicates with the flow-guiding columns 302 through the counterbore 608. The housing component 6 may be made of stainless steel, copper, or other materials.

In order to improve the service life of the sensor, a reinforcing layer 604 may be further provided outside the probe 602. The reinforcing layer 604 is a metal layer integrally formed with the housing component 6 and the probe 602 so as to prevent damage of the probe 602 if the sensor is dropped. The probe 602 and the cup-shaped accommodating cavity 601 are integrally formed by machining, without additional injection moulding or stamping mould. The manufacturing process is simple, and the dimension of the outline of the sensor is effectively reduced, which takes up a smaller space. The inner bottom portion of the probe 602 is provided with a heat conductive material layer 605. The heat conductive material layer 605 fills at least ⅓ of the capacity in the probe 602. The heat conductive material layer 605 is wrapped around an outer portion of the temperature sensor element 5. The heat conductive material layer can be made of thermal conductive silica gel, heat conductive ceramic, or heat conductive metal. In this embodiment, heat conductive glue is used. The heat conductive glue can fully fill the inside of the probe after being cured. The enclosed-type probe described in this embodiment effectively prevents the temperature sensor element from being exposed to the medium to be measured, especially a corrosive measuring medium.

As shown in the figures, the housing component 6 is also provided a threaded interface 606. The threaded interface 606 is arranged at the outer bottom portion of the accommodating cavity 601, and is used to install the sensor on a device or other measurement system.

Obviously, the foregoing embodiments are merely examples for clear description, and are not intended to limit the implementation. For those of ordinary skill in the art, other changes or modifications in different forms can be made on the basis of the above description. It cannot and is not necessary to give an exhaustive list of all methods of implementation. Obvious changes or modifications derived from the description are still within the scope of protection of the invention in the present application.

What is claimed is:

1. A temperature-pressure integrated sensor, characterized in that the sensor comprises: an electrical connecting member, a pressure sensor element, and a basal body assembly that are sequentially connected; a flexible modulation circuit board provided between the pressure sensor element and the electrical connecting member, the pressure sensor element being directly connected with the flexible modulation circuit board; a conductive extension portion connected with the flexible modulation circuit board, the conductive extension portion extending from a top end of the pressure sensor element to a bottom end surface of the basal body assembly; and a temperature sensor element disposed at a bottom end of the conductive extension portion.

2. The temperature-pressure integrated sensor according to claim 1, characterized by further comprising a housing component, the housing component comprising an accommodating cavity and a probe being in communication with the accommodating cavity, the accommodating cavity being used for accommodating the flexible modulation circuit board, the pressure sensor element, the basal body assembly, and a portion of the electrical connecting member, the conductive extension portion extended to an inner bottom portion of the probe through the pressure sensor element and the basal body assembly.

3. The temperature-pressure integrated sensor according to claim 2, characterized in that the pressure sensor element comprises a base and a pressure-sensitive membrane provided at a bottom face of the base, and the flexible modulation circuit board is disposed at a top face of the base.

4. The temperature-pressure integrated sensor according to claim 3, characterized in that the basal body assembly comprises a cylindrical basal body and two flow-guiding columns disposed at a bottom portion of the cylindrical basal body, each flow-guiding column being provided with a through-hole disposed along an axial direction of the flow-guiding column for guiding a test fluid towards the pressure sensor element, the pressure sensor element being disposed at a top portion of the cylindrical basal body.

5. The temperature-pressure integrated sensor according to claim 4, characterized in that a vertical guiding groove and a horizontal guiding groove are provided on a sidewall and a bottom face of the cylindrical basal body for accommodating the conductive extension portion; the electrical connecting member being provided with a clamping portion that is fitted into the vertical guiding groove, the clamping portion being clamped at the vertical guiding groove.

6. The temperature-pressure integrated sensor according to claim 5, characterized in that an outer wall of each flow-guiding column is provided with a mounting groove, a first sealing ring being disposed in the mounting groove, and a second sealing ring being disposed between the cylindrical basal body and the pressure sensor element.

7. The temperature-pressure integrated sensor according to claim 6, characterized in that a counterbore is provided in the housing component at a position corresponding to the flow-guiding columns for installing the flow-guiding columns, a bottom portion of the counterbore being provided with a flow channel that is in communication with the counterbore for guiding ingress of the test fluid.

8. The temperature-pressure integrated sensor according to claim 7, characterized in that the probe is a hollow cylindrical probe with a sealed bottom end, an outer portion of the probe being provided with a reinforcing layer, the inner bottom portion of the probe being provided with a heat conductive material layer, the heat conductive material layer being wrapped around an outer portion of the temperature sensor element.

9. The temperature-pressure integrated sensor according to claim 8, characterized in that the conductive extension portion and the flexible modulation circuit board are integrally formed and free to bend, the conductive extension portion being abutted against the vertical guiding groove and the horizontal guiding groove, bent and extended in a direction away from the pressure sensor element, and disposed perpendicular to the bottom face of the cylindrical basal body at a center thereof, the conductive extension portion being fixed in the horizontal guiding groove by a H-shaped fastener.

10. The temperature-pressure integrated sensor according to claim 9, characterized in that the sidewall of the cylindrical basal body is further provided with two mounting slots, the electrical connecting member being provided with clamping pieces that are fitted in the mounting slots, the clamping pieces being in snap connection with the mounting slots.

11. The temperature-pressure integrated sensor according to claim 1, characterized in that the pressure sensor element comprises a base and a pressure-sensitive membrane provided at a bottom face of the base, and the flexible modulation circuit board is disposed at a top face of the base.

12. The temperature-pressure integrated sensor according to claim 11, characterized in that the basal body assembly comprises a cylindrical basal body and two flow-guiding columns disposed at a bottom portion of the cylindrical basal body, each flow-guiding column being provided with a through-hole disposed along an axial direction of the flow-guiding column for guiding a test fluid towards the pressure sensor element, the pressure sensor element being disposed at a top portion of the cylindrical basal body.

13. The temperature-pressure integrated sensor according to claim 12, characterized in that a vertical guiding groove and a horizontal guiding groove are provided on a sidewall and a bottom face of the cylindrical basal body for accommodating the conductive extension portion;

the electrical connecting member being provided with a clamping portion that is fitted into the vertical guiding groove, the clamping portion being clamped at the vertical guiding groove.

14. The temperature-pressure integrated sensor according to claim 13, characterized in that an outer wall of each flow-guiding column is provided with a mounting groove, a first sealing ring being disposed in the mounting groove, and a second sealing ring being disposed between the cylindrical basal body and the pressure sensor element.

15. The temperature-pressure integrated sensor according to claim 14, characterized in that a counterbore is provided in the housing component at a position corresponding to the flow-guiding columns for installing the flow-guiding columns, a bottom portion of the counterbore being provided with a flow channel that is in communication with the counterbore for guiding ingress of the test fluid.

16. The temperature-pressure integrated sensor according to claim 15, characterized in that the probe is a hollow cylindrical probe with a sealed bottom end, an outer portion of the probe being provided with a reinforcing layer, the inner bottom portion of the probe being provided with a heat conductive material layer, the heat conductive material layer being wrapped around an outer portion of the temperature sensor element.

17. The temperature-pressure integrated sensor according to claim 16, characterized in that the conductive extension portion and the flexible modulation circuit board are integrally formed and free to bend, the conductive extension portion being abutted against the vertical guiding groove and the horizontal guiding groove, bent and extended in a direction away from the pressure sensor element, and disposed perpendicular to the bottom face of the cylindrical basal body at a center thereof, the conductive extension portion being fixed in the horizontal guiding groove by a H-shaped fastener.

18. The temperature-pressure integrated sensor according to claim 17, characterized in that the sidewall of the cylindrical basal body is further provided with two mounting slots, the electrical connecting member being provided with clamping pieces that are fitted in the mounting slots, the clamping pieces being in snap connection with the mounting slots.

* * * * *